United States Patent
Vartiainen

[15] 3,677,327
[45] July 18, 1972

[54] METHOD FOR THE RECOVERY OF HEAT FROM HOT GRANULAR MATERIAL

[72] Inventor: Osmo O. Vartiainen, Kokkola, Finland
[73] Assignee: Outokumpu Oy, Toolonkatu, Helsinki, Finland
[22] Filed: June 24, 1969
[21] Appl. No.: 843,899

[30] Foreign Application Priority Data
June 26, 1968 Finland....................................1807/68

[52] U.S. Cl...................................165/1, 165/120, 165/169
[51] Int. Cl............................................................F24h 3/02
[58] Field of Search......................................165/169, 120, 1

[56] References Cited
UNITED STATES PATENTS

| | | | |
|---|---|---|---|
| 2,094,785 | 10/1937 | Flint | 165/120 |
| 2,812,169 | 11/1957 | Felbeck et al. | 165/120 |
| 2,891,320 | 6/1959 | Buff | 165/120 |

*Primary Examiner*—Charles Sukalo
*Attorney*—Albert M. Parker

[57] ABSTRACT

This invention relates to a method and to a device for recovery of heat from hot granular or fragmentary material during its transportation on a conveyor the heat being transmitted by conduction or radiation to a cooling medium flowing in channels built in a track having at least one cooling surface with which at least the conveyor is in contact during the transportation and which track preferably surrounds the conveyor and the granular material to be cooled.

3 Claims, 3 Drawing Figures

3,677,327

METHOD FOR THE RECOVERY OF HEAT FROM HOT GRANULAR MATERIAL

BACKGROUND OF THE INVENTION

1. Field of the Invention

This invention relates to a method and device for the recovery of heat from hot, granular or fragmentary material by indirect cooling.

2. Description of the Prior Art

The conveying and cooling of hot, granular or fragmentary materials and the recovery of heat in a form as useful as possible are very common phases of process in metallurgical and chemical industries. The technical realization of these three processes — conveying, cooling, and recovery of heat — is more difficult the higher the temperatures of heat in question are.

According to the techniques generally used so far, hot material is cooled by quenching, and the solid material is separated to be processed further at a water humidity of, for instance, 20 percent. Further processes, such as reduction, agglomeration, etc., usually require drying the material. The heat transmitted to the cooling water is wasted because the rise of temperature of the water must be kept very insignificant, usually some 5° to 10° C, in order to prevent excessive vaporization. In addition, part of the finest fraction of material is removed with the water, thus sometimes resulting in considerable losses of material.

In case the material must be kept dry even during the cooling process, the cooling is carried out, for example, in a separate cooling cylinder, either by direct sprinkling of water so that all the used water is vaporized or by indirect cooling in that the entire cooling cylinder rotates partly immersed in a water basin. Usually the recovery of heat is economical in neither case.

Several special coolers have been developed, such as devices that function according to the principles of the moving-bed or fluidization, in which heat is recovered, for example, in the form of low-pressure vapor by indirect cooling. However, the use of such devices is limited because of their functional complexity caused by blowers, dust separators, etc., and because of the fact that they must be generally placed in the immediate proximity of the reactor in which the material to be cooled is produced, because the solution to the transportation problem of this hot material is of essential importance in the economy of processes of this kind.

The material cooled by the method described above is then conveyed with commonly used conveyors that resist rather low temperatures, such as 50° to 200° C.

SUMMARY OF THE INVENTION

The purpose of this invention is to create a method and device by which hot, granular or fragmentary material can be conveyed and cooled and its heat recovery simultaneously and in the same device more economically than before; the main characteristics of the invention are presented in the enclosed claim 1.

Another characteristic of the method as set forth by the invention is that the cooled material is mixed during the conveying and cooling processes in order to obtain a more effective transmission of heat. It is also advantageous to let the conveyor cool or cool it before the point of feeding the material to be cooled and advantageously all the way between the discharge and feeding points, when the conveyor is not loaded. The cooling is carried out either with the current or against a counter-current or a combination of the two. Usually it is advantageous to use the method of cooling against a counter-current because it is more effective but, particularly in the initial phase of the conveying it is most advantageous to use the method of cooling with the current in order to obtain quick cooling. According to one particularly advantageous characteristic of the method as set forth by the invention the temperature of the surfaces on the side of the space for material is chosen so that the condensation of corrosive gases possibly escaping from the material to be cooled is prevented from forming on the heat surfaces. In addition, advantageously only heat caused by the vaporization of the cooling medium is used.

As was mentioned above, another purpose of this invention is to create a device for the application of the method as set forth by the invention. This device has a cooler for indirect cooling of hot, granular or fragmentary material. The cooler as set forth by the invention is an oblong track along which the material to be cooled is moved by a headless conveyor in contact with the track. The track has one or more heat surfaces to recover heat from the material to be cooled. In this way the material is cooled while it is being conveyed. The cross-section of the track is advantageously a right-angled quadrangle, in which case it has four heat surfaces equipped with channels for the cooling medium; the heat surfaces are advantageously covered entirely with channels for the cooling medium running in a lengthwise direction of the track.

As set forth by the invention the device can be fitted with a continuously operating apparatus for controlling and measuring the length of the conveyor.

For example, in order to save space the track can, according to the invention, be installed in two different layers or levels, which are connected with each other at the ends; in this case hot material is introduced into the upper level and the cooled material discharged from the lower level.

BRIEF DESCRIPTION OF THE DRAWING

The invention will be described below in more detail, referring to the enclosed figures.

DESCRIPTION OF THE PREFERRED EMBODIMENT

Figure 1:
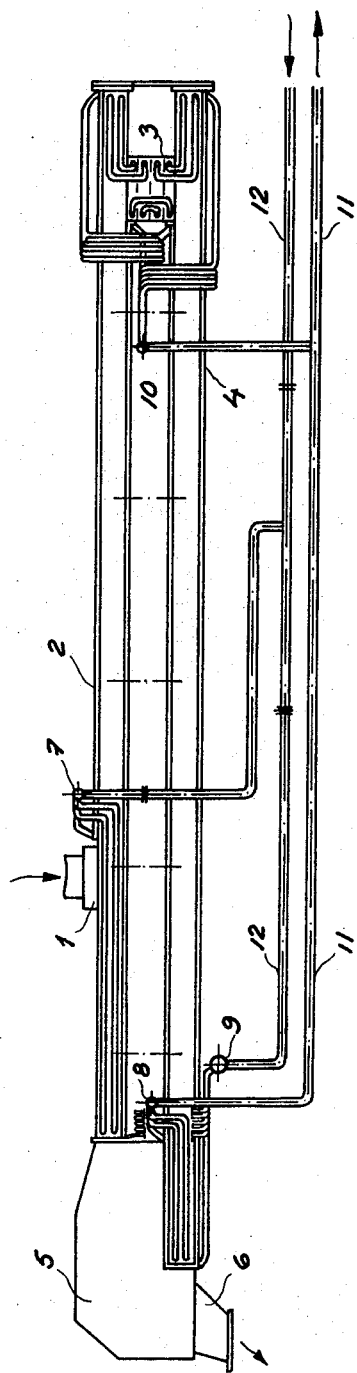
FIG. 1 is a side view of one embodiment of the device as set forth by the invention.

In FIG. 1, number 1 refers to the point for feeding hot, granular or fragmentary material. From this point the material falls onto the conveyor, which moves inside the track and conveys the material to the other end, or the direction changing end, of the upper layer 2 of the track, where the material falls along the shaft 3 to the lower level 4 and is removed through the discharge opening 6 installed at the opposite end 5 of the lower level. Numbers 7 and 9 indicate the branching boxes designed to distribute the water to the different parts of the cooling mantle of the track. Numbers 8 and 10 refer to the boxes designed to assemble steam and water, through which the mixture of steam and water is removed along the discharge pipe 11. Number 12 refers to the pipe for introducing water to the two branching boxes.

Figure 2:
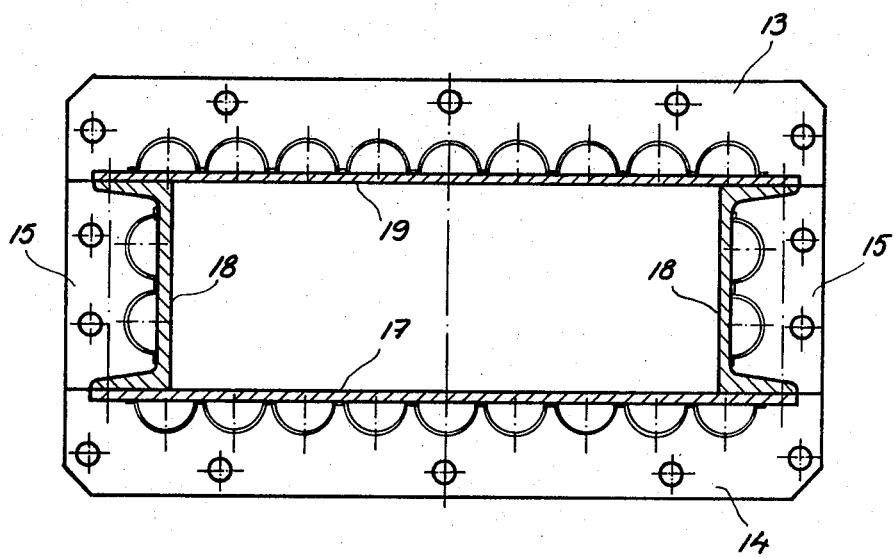
FIG. 2 is a cross-section of the track belonging to the device.
Figure 3:
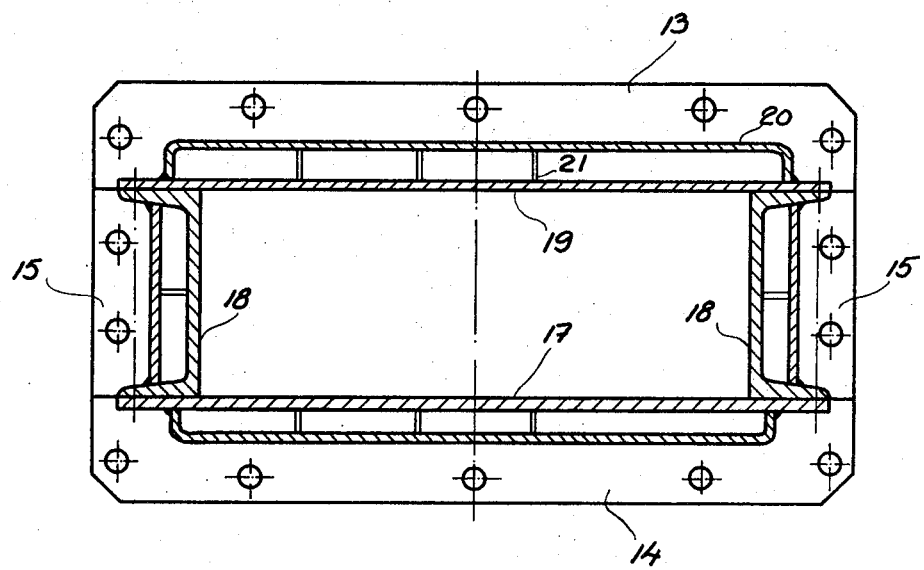
FIG. 3 presents the cross-section of the track belonging to another embodiment of the device.

FIGS. 2 and 3 illustrate two different embodiments of the cooling mantle of the track. Numbers 13 to 15 indicate the flanges of the different parts of the track. Number 17 indicates the bottom plate of the track, along which the conveyor and material are moved (not illustrated). Heat is substantially transmitted to the bottom plate 17 by conduction; to the side plates 18 and the cover plate 19 essentially by convection and radiation.

In FIG. 2, number 16 indicates pipes split lengthwise and fitted to the outer surfaces of plates 17 to 19. The cooling medium is fed into the intermediary space determined by these pipes and the plates in a lengthwise direction of the track.

In the embodiment of the device illustrated in FIG. 3, the cooling mantle is formed of plate-like material 20, forming passages extending over the entire width of the plates 17 to 19. The passages have been divided by partitions 21 into smaller departments running in a lengthwise direction of the track.

The conveying of the material takes place advantageously by a dog conveyor. The structure of the conveyor must be such that a transmission as good as possible is obtained between the cooled bottom plate 17 and the dog in order to keep the temperature of the dog sufficiently low. All the parts of the dog chain have been made of a special material, taking into consideration the tensile strength at the temperature in question, the expansion caused by heat in the dog chain, the dowels and the sockets. Also the hardness of the surface of the conveyor chain must fulfill certain requirements.

In order to adapt to the total expansion of the dog chain, the conveyor is equipped with a continuously operating device for controlling and measuring the length of the chain. The necessary adjustment can be carried out from outside while the conveyor moves.

In tests performed under normal operation conditions, the maximum temperature of the interior part of the dog, as well as the heat transmission coefficients between the dog and the bottom plate of the conveyor, has been successfully measured.

The point for feeding material 1 must be chosen so that the chain of the conveyor will have time to cool sufficiently on the part of the conveyor on which it will not come in contact with the material to be cooled.

Both the driving wheels have been made of material that resists the temperatures in question; their axes are water-cooled.

In order to increase the cooling efficiency of the conveyor the structure of the dog can be made so that a controlled stirring of the material is obtained during the conveying — a continuous change of material is obtained in relation to the cooling surfaces 17 to 19. The speed of the conveyor dog is in this case somewhat greater than the average speed of the material on the track. The use of conveyor dogs run at a speed somewhat greater than the average speed of conveyed material to effect mixing is well known in the art, and, although the present invention utilizes the technique in a new way to achieve better heat transfer, suitable known mechanisms will suggest themselves to those skilled in the art. The mixing of the material has a strong effect on the transmission of heat.

The device can also be fitted so that it can be simultaneously used as a lifting conveyor.

As was mentioned above, the material is cooled during the conveying phase indirectly by transmitting the heat by conduction, convection and radiation to the water or a mixture of water and steam flowing on the other side of the cooling mantle.

The pressure of the steam to be generated has been chosen so that the temperature prevailing on the cooled plates 17, 18 and 19 on the side of the space for material is above the dew point of the corrosive gas components in the track. This is one of the most important advantages of the device compared with the commonly used cold-water cooling (10° to 30° C) in similar conveyors.

The bottom, sides and cover plates of the track (17 to 19) form a cooling mantle, which has been designed to keep the heat load as even as possible in relation to the different parts of the cooling mantle. The circulation of water in relation to the direction of movement of the material may take place either with the current or against a counter-current, depending on the local heat-load of the system. For instance, the cooling of the point 1 where material is fed on the conveyor should be arranged so that the role of the steam phase in the mixture of steam and water is as insignificant as possible, and thus a cooling as effective as possible is obtained at the point in question even under greatly varying conditions of operation.

It is advantageous to choose the temperature of the cooling water so that only the vaporization heat of the water is made use of. In this case the temperature of the water and the forming steam are the same. This greatly facilitates the precautions for the heat expansion in the device.

The cooling of granular ferric oxide formed in the oxidation of ferrous sulphides can be mentioned as an example of the numerous different possibilities for the use of the device. It is discharged from the reactor as a continuous flow at the temperature of about 1,000° C and cooled to some 500°–600° C while it is conveyed to the next process phase. The amount of heat liberated in the cooling of the material is recovered in the said device, for instance, in the form of steam of some 4.5 aty, which is useful as such or indirectly in the pre-heating of the feeding water of the boiler system of an industrial plant.

The device as set forth by the invention is able, as was mentioned above, to take care of the phases of conveying, cooling and recovery of heat simultaneously. Even though the final temperature of some 500°–600° C of the material is mentioned as an example for the newly developed device, there is nothing to prevent it from being cooled with the same method to, for example, 150° C. In this case, however, water-cooling of 100° C should be used in the final phase.

I claim
1. Method for the recovery of heat in the form of steam from hot, granular material by indirect cooling during the forward movement of the material, comprising mixing the hot, granular material while moving the material forward through an enclosure by means of a conveyor run at a speed somewhat greater than that at which the material is moved forward and simultaneously cooling surfaces of the enclosure in order to recover into a cooling medium heat transmitted to the surfaces by conduction and radiation but keeping the temperature of the surfaces sufficiently high to prevent condensation on the surfaces of any corrosive gases escaping from the hot, granular material.

2. Method according to Claim 1 including feeding said material on to a conveyor, allowing the conveyor to carry the material to a discharge point and cooling the conveyor from a point before it receives the material and all of the way to a point at which the material is discharged.

3. Method according to Claim 2, wherein the hot, granular material is cooled according to the principle of current direction, at least in an initial phase of the conveying in order to obtain quick cooling.

* * * * *